US012169057B2

(12) United States Patent
Sergyeyenko et al.

(10) Patent No.: US 12,169,057 B2
(45) **Date of Patent: *Dec. 17, 2024**

(54) BATTERY POWERED LIGHT

(71) Applicant: Black & Decker Inc., New Britain, CT (US)

(72) Inventors: Oleksiy P. Sergyeyenko, Baldwin, MD (US); Patrick J. Tilson, Parkville, MD (US); Sean M. Bailey, Baltimore, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/986,016

(22) Filed: Nov. 14, 2022

(65) Prior Publication Data

US 2023/0075761 A1 Mar. 9, 2023

Related U.S. Application Data

(63) Continuation of application No. 17/569,612, filed on Jan. 6, 2022, now Pat. No. 11,530,802, which is a (Continued)

(51) Int. Cl.
*F21V 21/14* (2006.01)
*F21L 4/04* (2006.01)
(Continued)

(52) U.S. Cl.
CPC ............ *F21V 21/145* (2013.01); *F21L 4/045* (2013.01); *F21V 21/0965* (2013.01); (Continued)

(58) Field of Classification Search
CPC .......... F21V 21/30; F21V 21/08; F21V 21/28; F21V 21/26; F21V 21/14; F21V 21/145; F21V 23/0414; F21V 21/0885; F21V 21/0925; F21V 21/406; F21V 7/0075; F21V 13/045; F21V 14/065; F21V 14/085; F16M 11/14; F16M 11/38; F16M 11/2014; F16M 11/2021; F16M 11/2064; F21L 4/045; F21L 2001/00; F21W 2111/10; B25B 21/00
See application file for complete search history.

(56) References Cited

U.S. PATENT DOCUMENTS 6,502,949 B1 * 1/2003 Horiyama .......... B23Q 17/2404 362/198
7,021,789 B2 * 4/2006 Dalton .................. F21V 21/145 362/418
(Continued)

FOREIGN PATENT DOCUMENTS

JP 2018037238 A * 3/2018 ................ F21L 4/02

*Primary Examiner* — Omar Rojas Cadima
(74) *Attorney, Agent, or Firm* — Stephen R. Valancius

(57) ABSTRACT

The present disclosure relates to a battery powered light. The light includes a removable battery pack and a base portion which receives the battery pack. A light section is operably connected to the base section. The light section includes a light generator which produces light. The light further includes a mount. The mount is movable so that the mount can attach to a variety of surfaces including at least a flat surface and a curved surface.

20 Claims, 25 Drawing Sheets

Related U.S. Application Data continuation of application No. 16/807,333, filed on Mar. 3, 2020, now Pat. No. 11,255,525.

(60) Provisional application No. 62/820,001, filed on Mar. 18, 2019.

(51) Int. Cl.

| | |
|---|---|
| ***F21V 21/096*** | (2006.01) |
| ***F21V 21/28*** | (2006.01) |
| ***F21V 21/30*** | (2006.01) |
| *F21Y 115/10* | (2016.01) |

(52) U.S. Cl.

CPC .............. *F21V 21/28* (2013.01); *F21V 21/30* (2013.01); *F21Y 2115/10* (2016.08)

(56) References Cited

U.S. PATENT DOCUMENTS

| | | | | |
|---|---|---|---|---|
| 7,591,572 | B1 * | 9/2009 | Levine | A47F 11/10 362/427 |
| 10,948,166 | B2 * | 3/2021 | Ohara | F21V 21/0965 |
| 11,255,525 | B2 * | 2/2022 | Sergyeyenko | F21L 4/045 |
| 2007/0127243 | A1 * | 6/2007 | Huang | B66F 3/25 362/253 |
| 2015/0276182 | A1 * | 10/2015 | Aoki | F21V 14/025 362/184 |
| 2018/0224077 | A1 * | 8/2018 | Bian | F21V 21/08 |

* cited by examiner

BATTERY POWERED LIGHT

CROSS-REFERENCE TO RELATED APPLICATIONS

This application is a continuation application of U.S. application Ser. No. 17/569,612 filed on Jan. 6, 2022, which is a continuation application of U.S. application Ser. No. 16/807,333 filed on Mar. 3, 2020, now U.S. Pat. No. 11,255,525 which claims the benefit of U.S. Provisional Application No. 62/820,001 filed on Mar. 18, 2019, entitled Battery Powered Light. The entire contents of all of the above are incorporated herein by reference.

BACKGROUND OF THE INVENTION

The present disclosure relates to a light. Battery powered lights are well-known. The present disclosure seeks to provide a battery powered light that is powered by a powered battery pack and is flexibly mounted and aimed.

SUMMARY OF EMBODIMENTS OF THE INVENTION

One aspect of the present disclosure relates to a battery powered light. According to one aspect there is an exemplary embodiment of a light which includes a removable battery pack, a base portion which receives the battery pack, a light section operably connected to the base section, the light section including a light generator which produces light. and a mount, the mount configured to be movable so that the mount can attach to a variety of surfaces including at least a flat surface and a curved surface.

The mount may include at least one mount member.

The at least one mount member may include a magnet.

The at least one mount member may be disposed on the base portion.

The at least one mount member may be rotatable with respect to the base portion.

There may be at least two mount members.

Each of the two mount members may be rotatable with respect to the base portion.

According to another aspect there is an exemplary embodiment of a light, the light including a removable battery pack, a base portion which engages the battery pack, an intermediate section which is rotatably connected to the base portion, and a light section which is rotatably connected to the intermediate section, the light section including a light generator which produces light.

The intermediate section is rotatable about a first axis.

The light section may be rotatable about a second axis

The first axis may be orthogonal to the second axis.

The light generator may be a light emitting diode.

The light section may be movable between a compact position, in which the light section is adjacent to the battery pack, and an extended position, wherein the light section is spaced apart from the battery pack.

The light section may include a light projecting surface from which light from the light generator is projected.

The light section may be moved to a closed position, in which a majority of the light projecting surface is blocked, and an open position in which a majority of the light projecting surface is exposed.

In the closed position, the light projecting surface may be blocked by the battery pack.

According to another aspect there is an exemplary embodiment of a light, the light including a removable battery pack, a base portion which receives the battery pack, a light section operably connected to the base section, the light section including a light generator which produces light, and a mount.

The mount may include a first mount member and a second mount member.

Each of the first mount member and the second mount member may include a magnet.

Each of the first mount member and the second mount member may be independently rotatable relative to the base portion.

The first mount member may be disposed on the base portion.

The second mount member may be disposed on the base portion.

The first mount member and the second mount member may be adjacent to one another.

The first mount member and the second mount member may be rotatable to positions parallel to one another, pointing away from one another and pointing towards one another.

The light may further include an intermediate section between the base portion and the light section.

The intermediate section may be rotatable relative to the base portion.

The light section may be rotatable relative to the intermediate section.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranged, 2-10, 1-9, 3-9, etc.

BRIEF DESCRIPTION OF THE DRAWINGS

For a better understanding of embodiments of the present invention as well as other objects and further features thereof, reference is made to the following description which is to be used in conjunction with the accompanying drawings, where:

FIG. 3 is a perspective view of the light of the exemplary embodiment in a compact position with the light on;

DETAILED DESCRIPTION OF EXEMPLARY EMBODIMENTS OF THE INVENTION

Figure 1A:
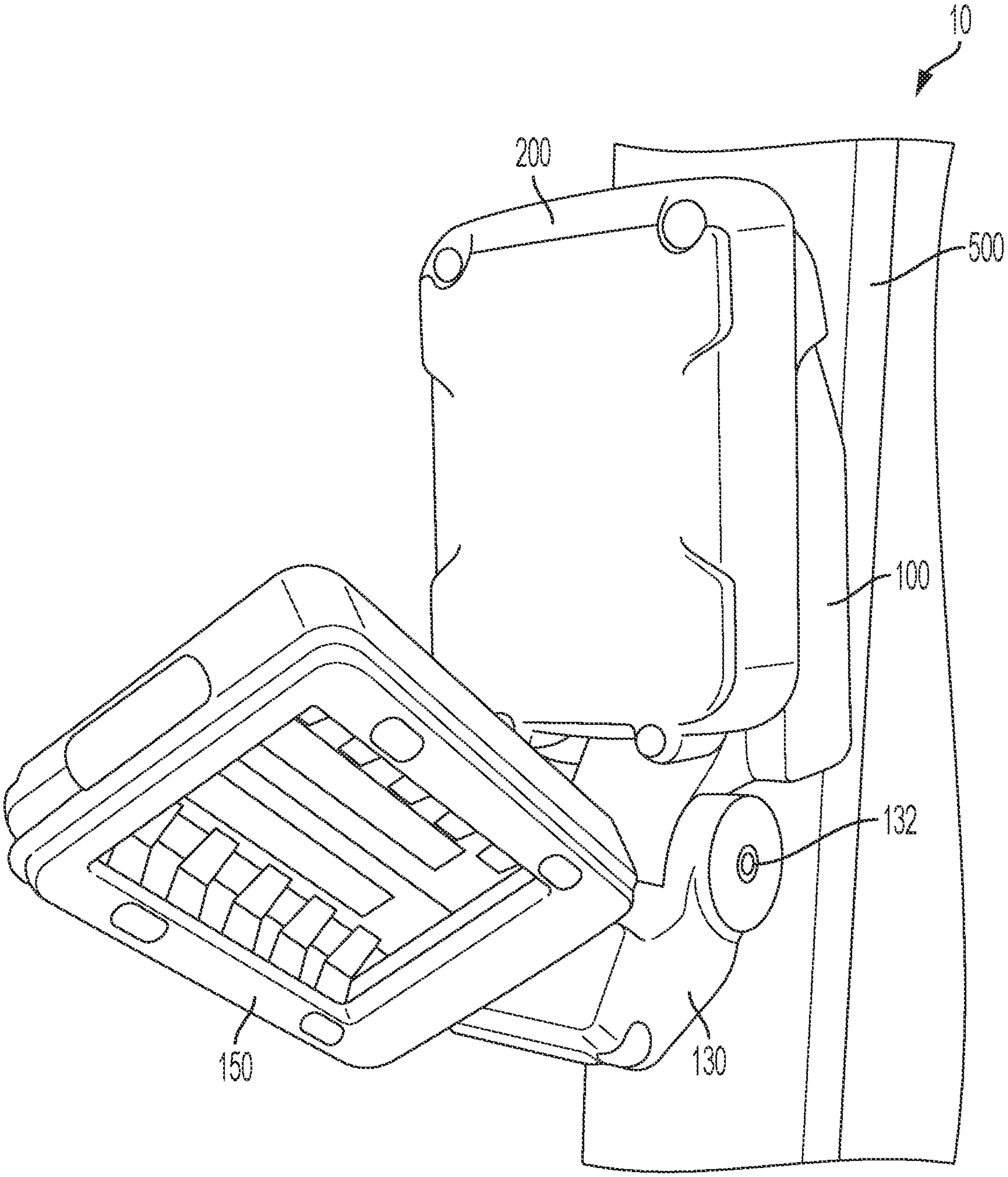
FIG. 1A is a perspective view of a light according to an exemplary embodiment mounted on a surface.

FIGS. 1-8 illustrate an exemplary embodiment of a battery powered mountable light 10. As shown in FIGS. 1-8, the mountable light 10 is powered by a battery pack 200. The battery pack 200 may be a power tool battery pack, such as those shown in U.S. Pat. No. 6,729,413 or U.S. Patent Application Publication No. 2014/0272516. U.S. Pat. No. 6,729,413 and U.S. Patent Application Publication No. 2014/0272516 are hereby incorporated by reference in their entirety. The battery pack 200 may therefore be engageable with various power tools to provide power to such power tools. For example, the battery pack 200 may be removed from the light 10 and engaged with a drill to power the drill. Similarly, the battery pack 200 may be engaged with an impact driver, circular saw, reciprocating saw, sander, or other power tool to power the tools.

As shown in FIGS. 1-8, the light includes a base portion 100. As shown in, for example, FIG. 4, the base portion 100 engages the battery pack 200. The battery pack also includes a mount 110. The mount 110 allows the light to be mounted onto various metal objects. As shown, the mount 110 includes a pair of mounting members 115. The mounting members 115 each include a pair of magnets 116, which allow the mounting members 115, and thus the light 10 generally, to stick to various metals. The mounting members 115 are rotatable, as will be described in more detail below.

The light 10 further includes an intermediate section 130 and a lighting section 150. The intermediate section 130 connects the base portion 100 and the lighting section 150. In the exemplary embodiment of FIGS. 1-8, an activation switch 131 is disposed on the intermediate section 130. A user may press the activation switch 131 to turn on the light 10. The intermediate section 130 is rotatable relative to the base portion 100 via a hinge 132.

The lighting section 150 houses a light. In the present exemplary embodiment, the lighting section 150 has a substantially rectangular box shape. It includes a light portion 151 which has a light emitting surface from which light is emitted. In the exemplary embodiment, the lighting section 150 houses a light generator in the form of a plurality of light emitting diodes (LEDs) 152. In the exemplary embodiment, there are two LED strips. Other configurations are also possible in other embodiments. For example, there may be more or less LEDs 152, the LEDs 152 may be placed in more rows and the LEDs 152 may be on a flat or angled surface. For example, there may be three LED strips. There may be an array of discrete LEDs. There may be a single LED. There may also be a reflector to direct light from the LEDs. Other light generators are also possible. For example, the light generator may be a light bulb, such as a halogen bulb.

The intermediate section 130 is connected to and rotatable with respect to the base portion 100. Additionally, the lighting section 150 is connected to and rotatable relative to the intermediate section 130. This rotatability in addition to the mounting members 115 described above, allows for the light 10 to be manipulated into various positions, as is shown in FIGS. 1-7.

FIG. 1A illustrates the light 10 mounted to a metal beam 500. The mounting members 115 described above (not shown in FIG. 1A) allow the light 10 to be mounted to the metal beam as the magnets 116 are attracted to and attach to the metal beam 500 holding the light 10 in place. The intermediate section 130 is in an open position. The lighting section 150 is disposed at an angle, and can be rotated about an axis.

Figure 1B:
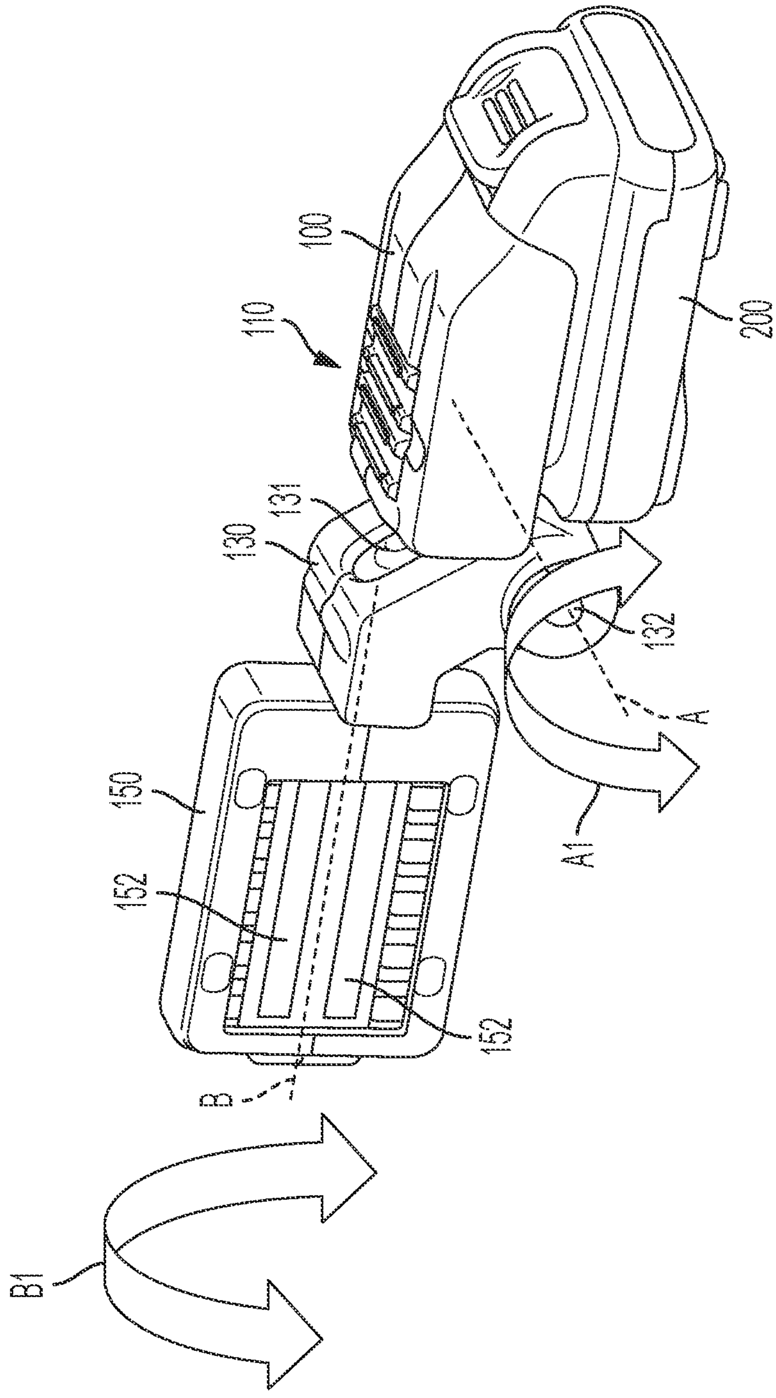
FIG. 1B is another perspective view of the light of the exemplary embodiment.

FIG. 1B illustrates the axes of rotation. As shown in FIG. 1B, the intermediate section 130 is rotatable about an axis A, as shown by arrow A1. Additionally, the lighting section 150 is rotatable about an axis B, as shown by arrow B1. The axis B is a longitudinal axis of the lighting section 150 that runs through substantially the center of the lighting section 150.

These rotational axes allow the light from the LEDs 152 to be directed to a particular location, such as to illuminate a work surface.

Figure 2:
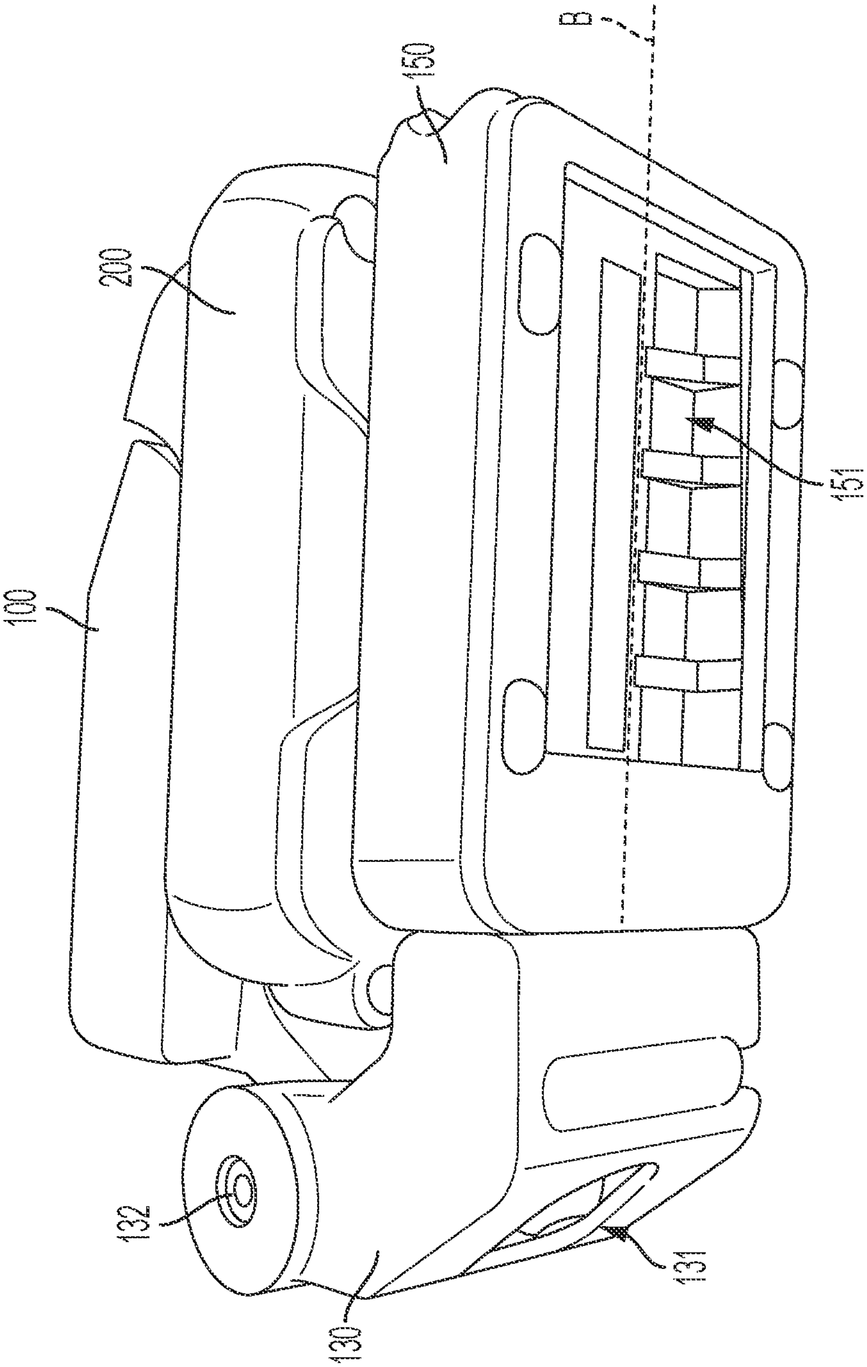
FIG. 2 is a perspective view of the light of the exemplary embodiment in a compact position.

FIG. 2 illustrates the intermediate section in a closed position with the light portion 151 pointing outwardly. This provides a compact configuration for the light 10 and allows the lighting section 151 to point out and illuminate objects. Accordingly, this configuration is both compact and open, because the lighting section 151, which includes a light projecting surface from which light projects, is not blocked.

Figure 3:
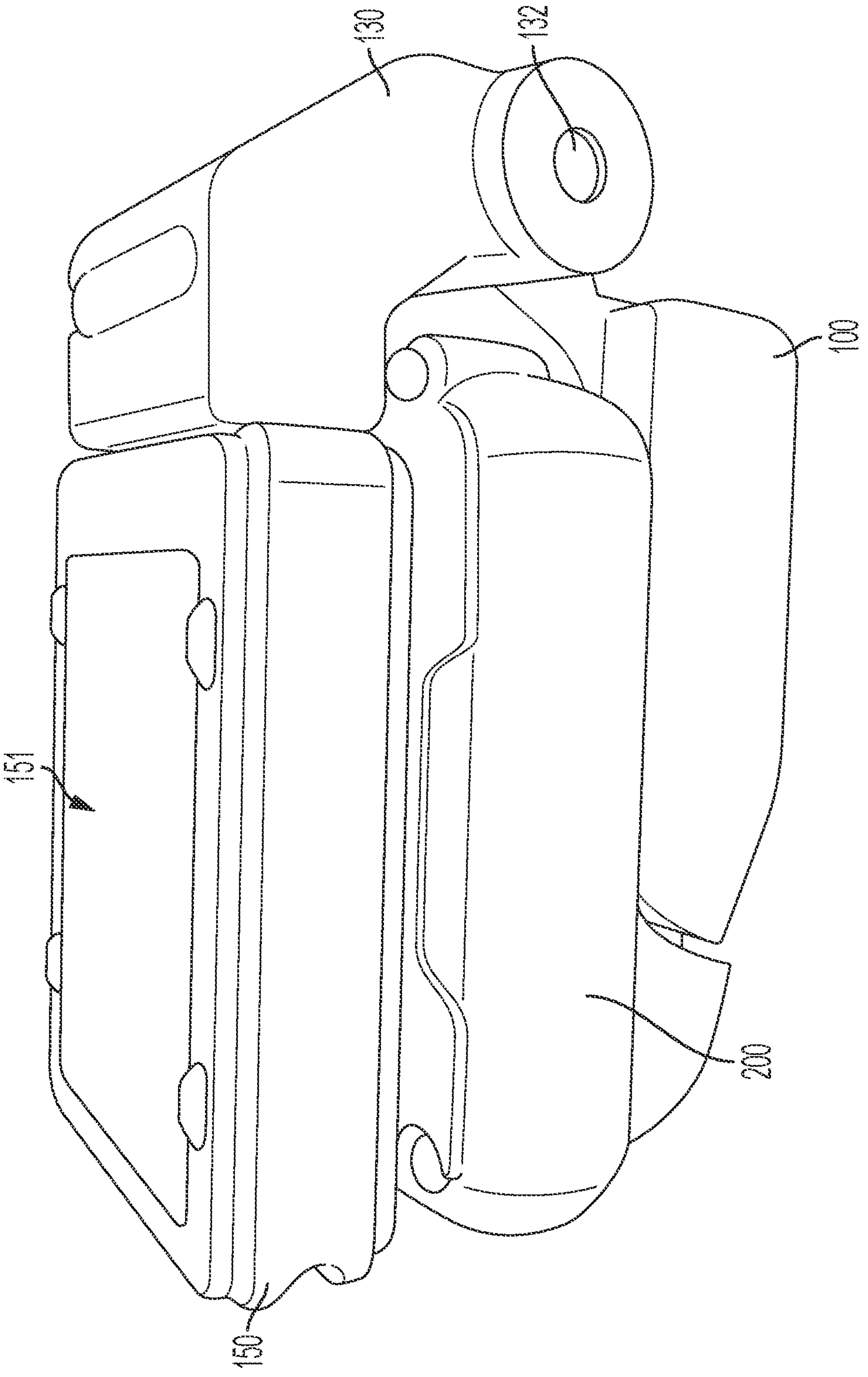

FIG. 3 illustrates the light in the same configuration as shown in FIG. 2, but with the LEDs 152 turned on so that the light portion 151 is illuminated. As shown, in this compact and open configuration, the light 10 effectively projects light to illuminate a surface. In the open position, significantly all of the light emitting surface of the light portion 151 is exposed allowing light to be emitted.

Figure 4:
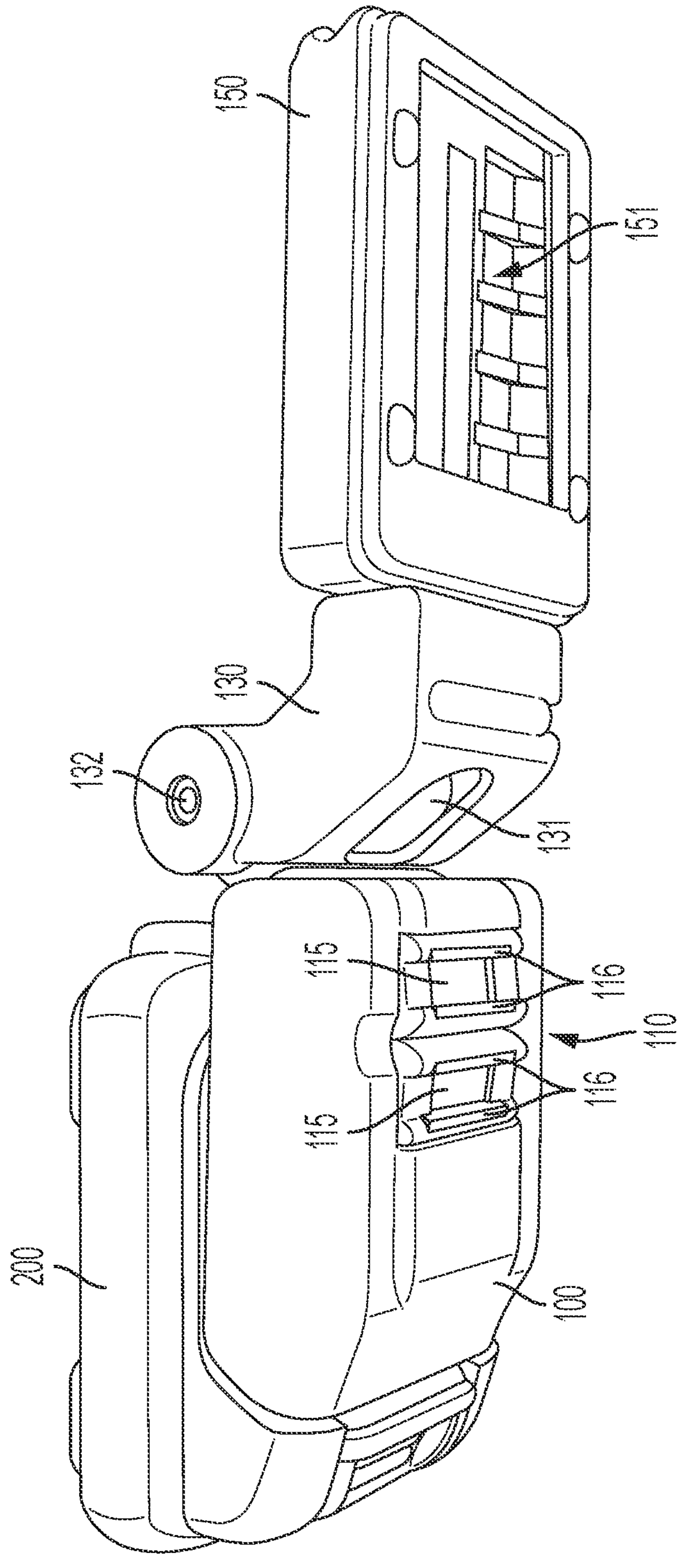
FIG. 4 is a perspective view of the light of the exemplary embodiment in an extended position.

FIG. 4 illustrates the light 10 with the intermediate section 130 in an open position so that the lighting section 150 is away from the base portion 100 and the battery 200. As previously discussed, the intermediate section 132 may pivot about the hinge 132.

Figure 5:
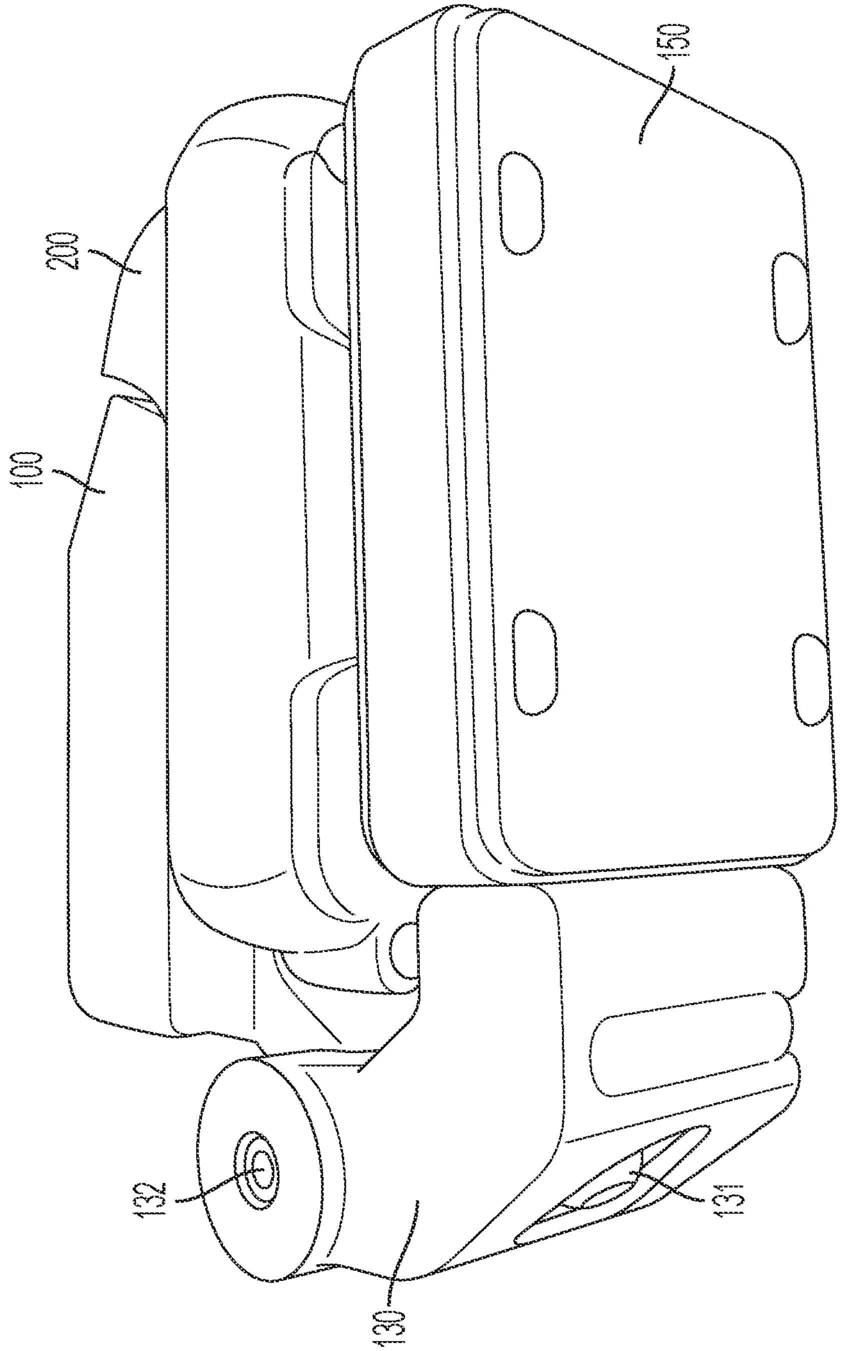
FIG. 5 is a perspective view of the light of the exemplary embodiment in a closed position.

FIG. 5 illustrates the light 10 in a closed position with the intermediate section 130 in a compact and closed position. Like in FIGS. 2 and 3, the intermediate section 130 is in a closed position and the lighting section 150 is abutting the battery pack 200. However, in this instance, wherein the lighting section 150 is in a closed position, the lighting section turned such that the light portion 151 abuts battery pack 200. In the position shown in FIG. 5, illumination from the light 10 is blocked even when the light 10 is turned on. This may be useful to prevent unintended illumination. In the exemplary embodiment of FIG. 5, most of the light projecting surface of the lighting section 150 is blocked. In other embodiments more or less light may be blocked, including at least a majority of the light projecting surface being blocked.

Figure 6:
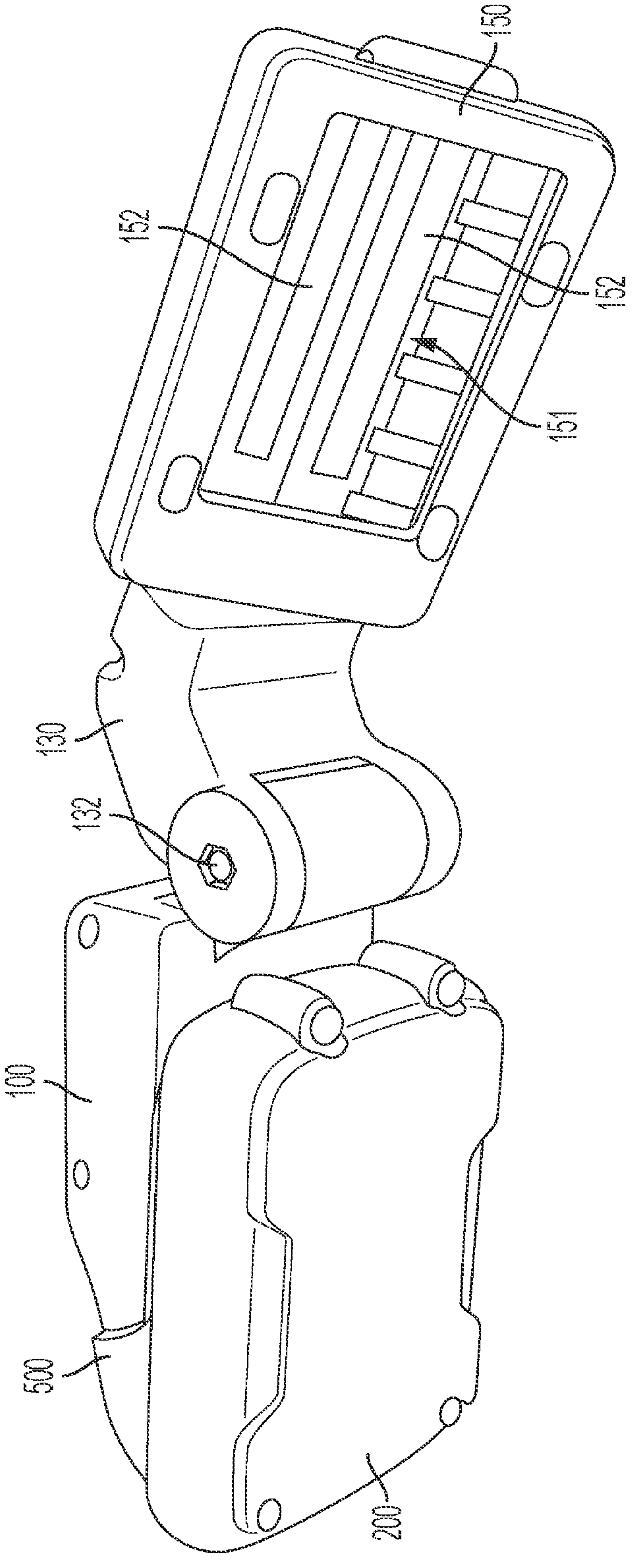
FIG. 6 is a perspective view of the light of the exemplary embodiment in an extended position and mounted on a surface.

FIG. 6 illustrates the light 10 in another lighting position. In FIG. 6, the base portion 100 is again attached to a metal beam 500. The intermediate section 130 is rotated away from the battery pack 200 and the lighting section 150 is rotated with respect to the intermediate section 130.

Figure 7:
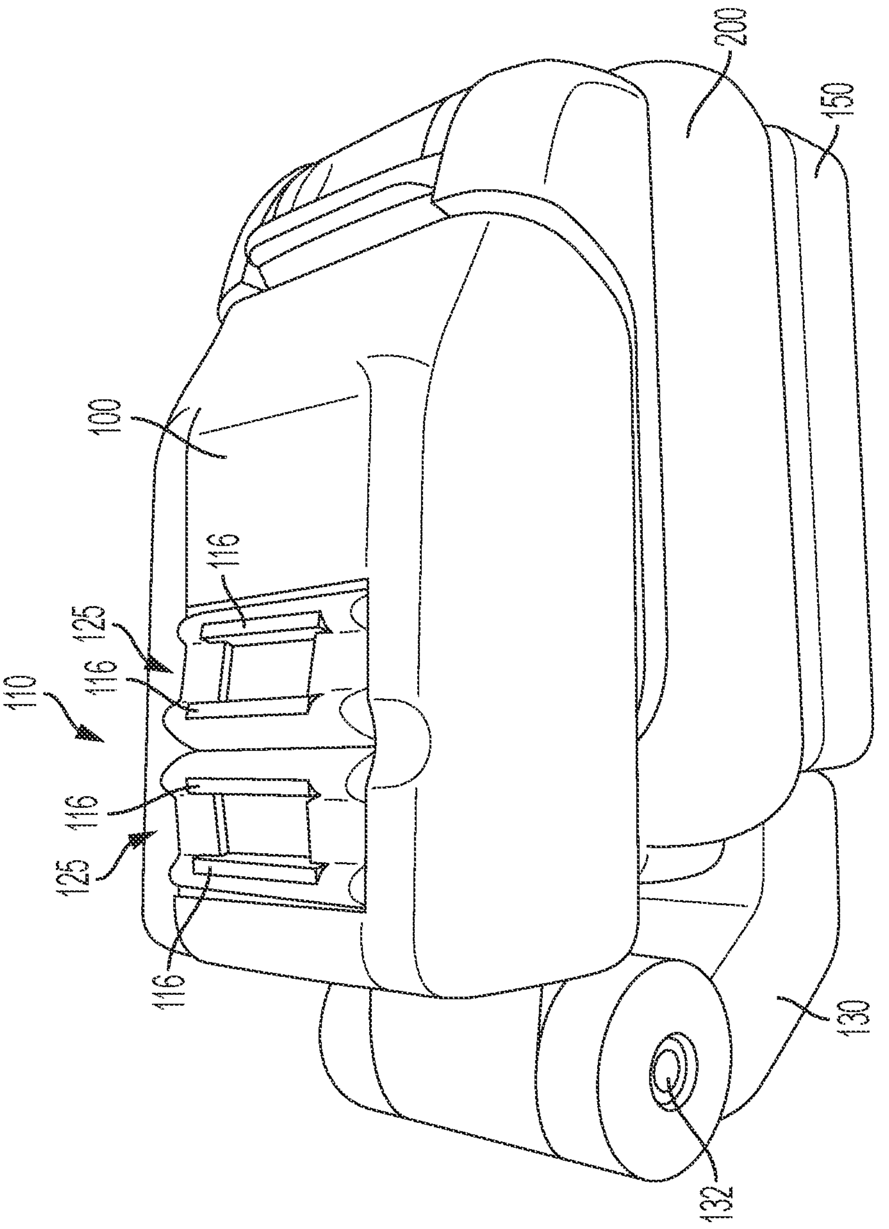
FIG. 7 is another perspective view of the light of the exemplary embodiment in a compact position.

FIG. 7 is another view of the light 10 in a closed configuration.

Figure 8:
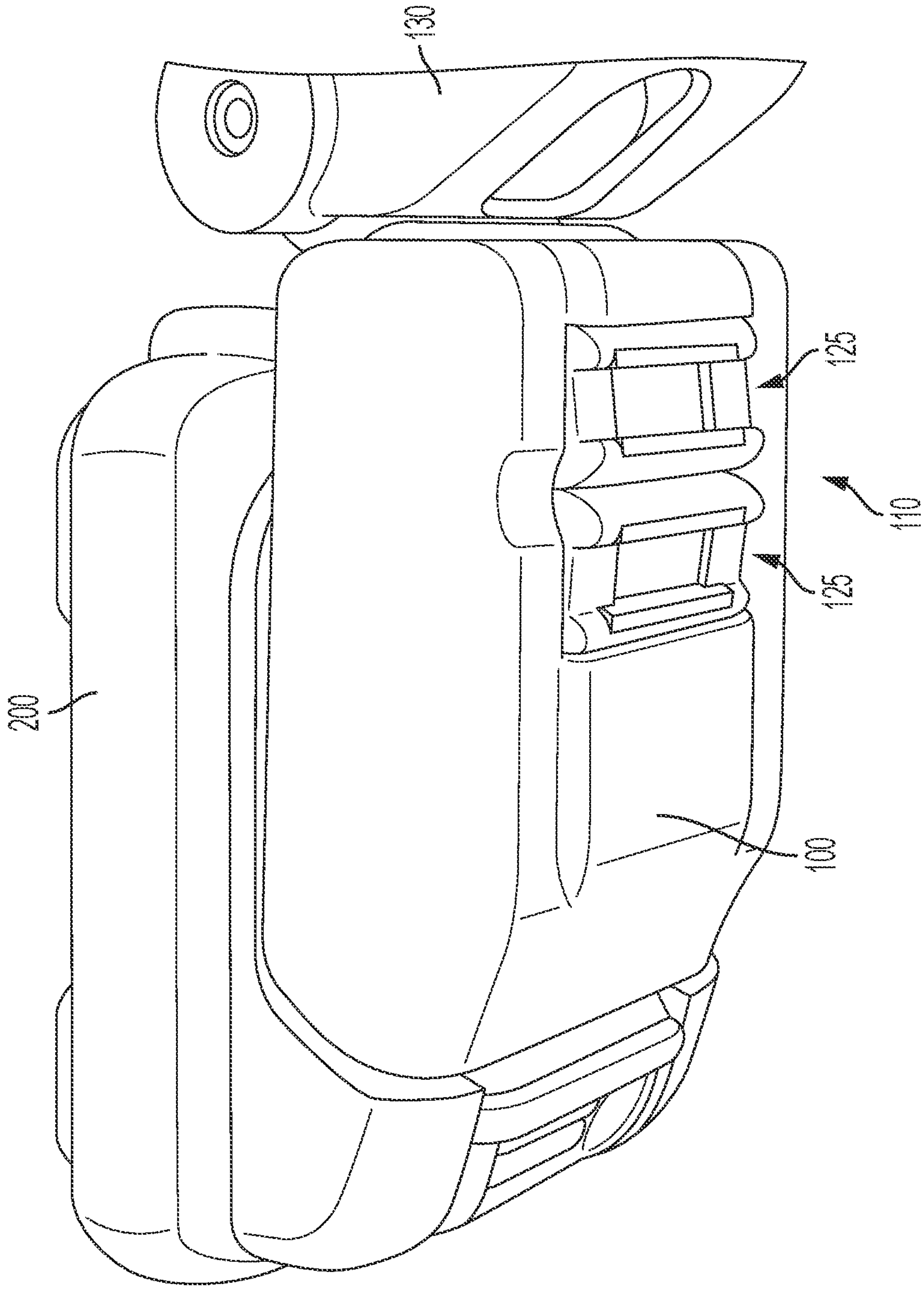
FIG. 8 is a perspective view of a portion of the light of the exemplary.

The mount 110 will be further described with reference to FIGS. 8-19. As shown in FIG. 8, the mount 10 includes a pair of mount members 125. The mount members 125 each have a pair of metal plates 116 and a magnet 115. In FIG. 8, a portion of a housing of the mount members 125 is removed so that the magnet 115 can be seen. As shown in FIGS. 9-12, the magnet 115 is typically covered by a housing 117. However, in some embodiments, portions of the magnet 115 may be exposed.

The mount members 125 are rotatable with respect to the base portion 100. This allows the mount members 125 to attach to various surfaces, such as curved surfaces, as will be described in further detail below. In the exemplary embodiment of FIGS. 1-8, the mount members 125 are disposed directly next to each other. However, as discussed below, in other embodiments, mount members may be spaced apart from one another.

Figure 10:
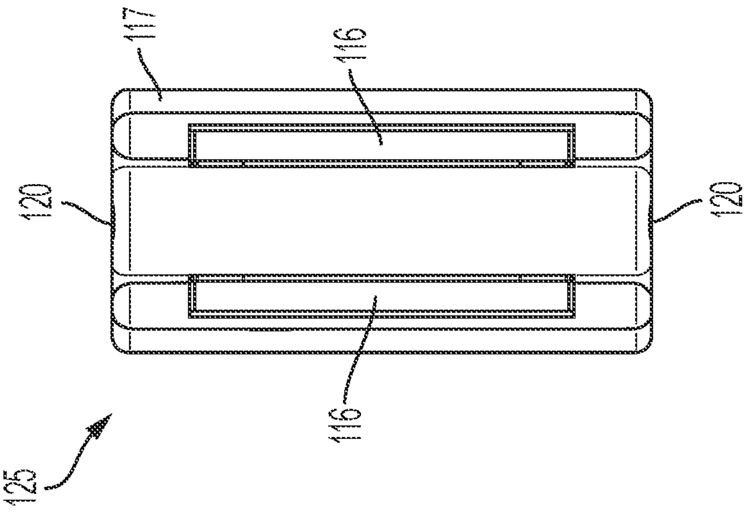
FIG. 10 is a top view of an exemplary embodiment of the mount member.
Figure 9:
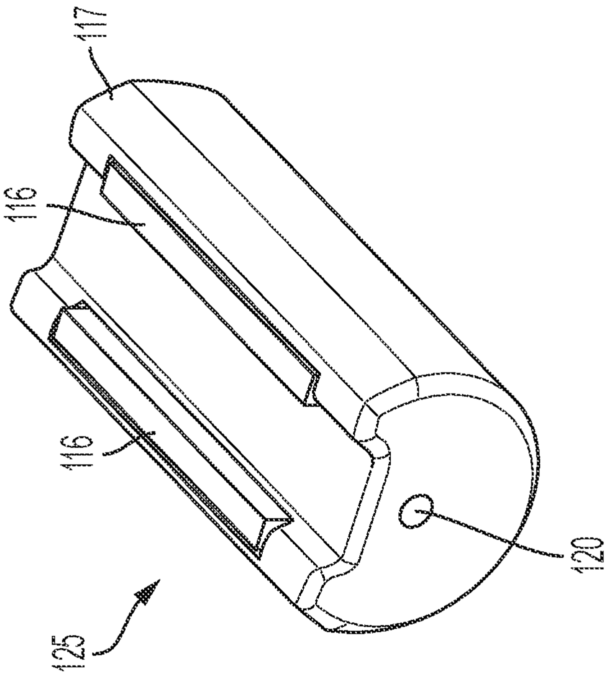
FIG. 9 is a perspective view of an exemplary embodiment of a mount member.
Figure 12:
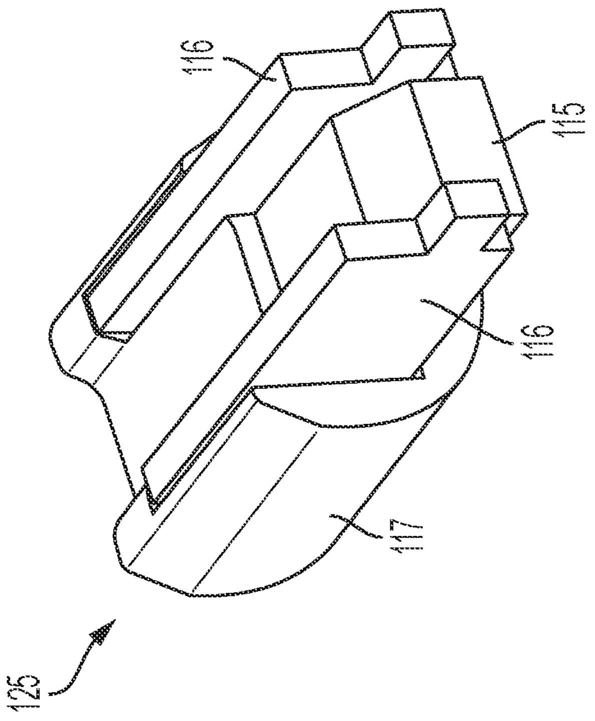
FIG. 12 is a perspective cut-away view of an exemplary embodiment of the mount member.
Figure 11:
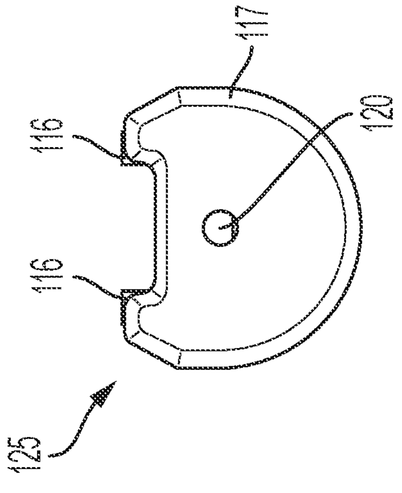
FIG. 11 is an end view of an exemplary embodiment of the mount member.

FIGS. 9-12 illustrate various views of the mount members. FIG. 9 illustrates a perspective view of a mount member 125 and FIG. 10 illustrates a top view of the mount member 125. FIG. 11 is an end view of the mount member 125 and FIG. 12 is a cut-away view showing the magnet 115.

As shown in FIGS. 9-11, each mount member 125 includes a mount member housing 117. A pair of metal plates 116 project through the housing 117 and can contact a surface. The mount members 125 also include a hinge hole 120 through which a rod runs allowing the mount members 125 to pivot.

FIG. 12 illustrates a cut-away view of a mount member 125 so that the magnet 115 and metal plates 116 can be seen. The metal plates 116 are made of a ferrous material. The metal plates 116 together with the magnet 115 create a magnetic field that make the mount members 125 attract and attach to metal objects. The metal plate 116 and magnet 115 arrangement creates a strong magnetic field while protecting the magnet 115 itself from breaking, as magnets can often be brittle. Nevertheless, in other embodiments, the magnet 115 may be exposed. A magnet may also be used without metal plates.

Figure 14:
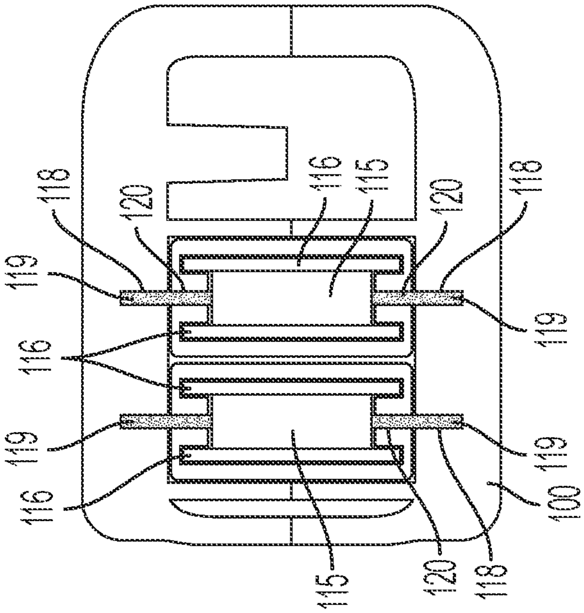
FIG. 14 is a schematic top view of an exemplary embodiment of the light.
Figure 13:
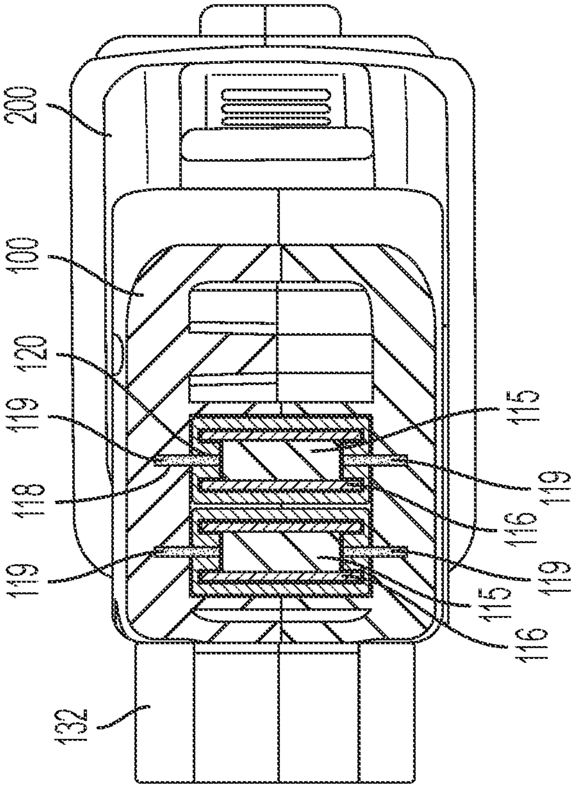
FIG. 13 is a partially cut-away top view of an exemplary embodiment of the light.

FIGS. 13 and 14 illustrate the connection of the mount members 125 with the rest of the light 10. FIG. 13 is a top view of the light 10 with a portion of the base portion 100 removed so that the connection can be shown. FIG. 14 is a schematic top view. As shown in FIGS. 13 and 14

As shown in FIGS. 13 and 14, the base portion 100 of the light 10 includes a hole 118. The hole 118 is aligned with the hole 120 of the mount members 125. A rod 119 is then fitted through the holes 118 and 120. In this way, the mount members 125 are rotatably connected to the base portion 100. There may be a single rod 119 for each mount member and the single rod 119 may travel through the entire mount member 119. In other embodiments, there may be a rod at each end, such that there are two rods for each mount member 125. Other means and methods of rotatably attaching the mount members 125 to the base portion 100 or other portions of the light 10 may also be used.

FIGS. 15-19 illustrate a mount 210 of a slightly different embodiment. The mount 210 includes mount members 225 are substantially similar to the mount members 125, except as otherwise noted. The mount members 225 may be used in place of the mount members 125 in the exemplary embodiment of the light 10 shown in FIGS. 1-8. Similarly, the mount members 125 may be used in place of mount members 225.

Figure 16:
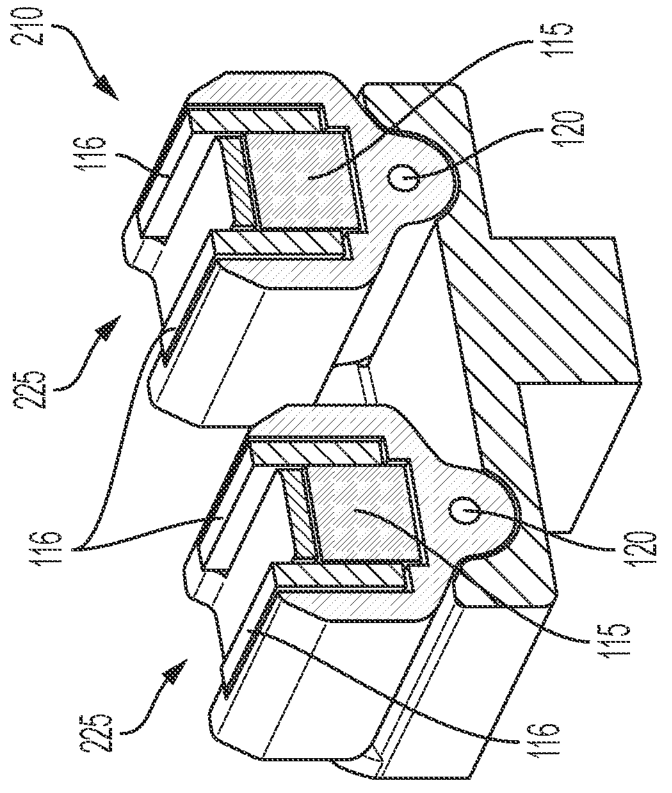
FIG. 16 is a perspective cut-away view of the exemplary embodiment of a mount section.
Figure 15:
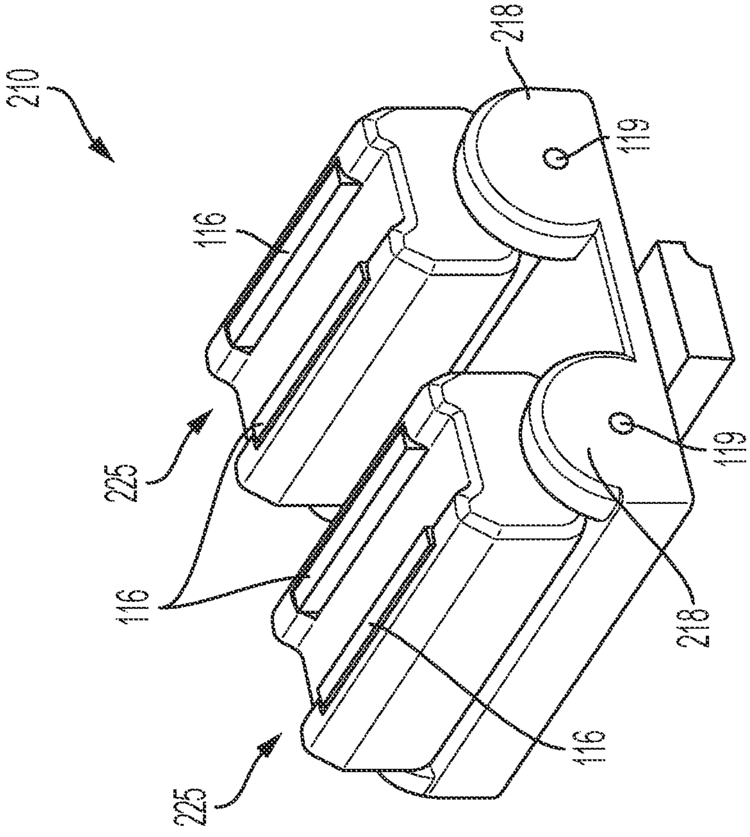
FIG. 15 is a perspective view of an exemplary embodiment of a mount section.

As shown in FIGS. 15-19, the mount members 225 are spaced apart from one another. The mount members 225 are covered by a plastic housing 117. FIG. 15 illustrates a perspective view of the mount members 225 and FIG. 16 illustrates a cut-away perspective view of the mount members 225 which shows a cross section of the magnets 115 and steel plates 116. The magnets 115, steel plates 116 and housing 117 may be the same as those used for the mount members 125.

As shown in FIG. 15, the mount members 225 are held in a mount base 218 with a hinge rod 119. As shown in FIG. 16 the mount members 225 include a hinge opening 120 that is concentric with the hinge rod 119 so that the rod 119 passes through the mount base 118. Accordingly, the mount members 225 are rotatably secured to the light 10 in a similar way as the mount members 125.

Figure 31:
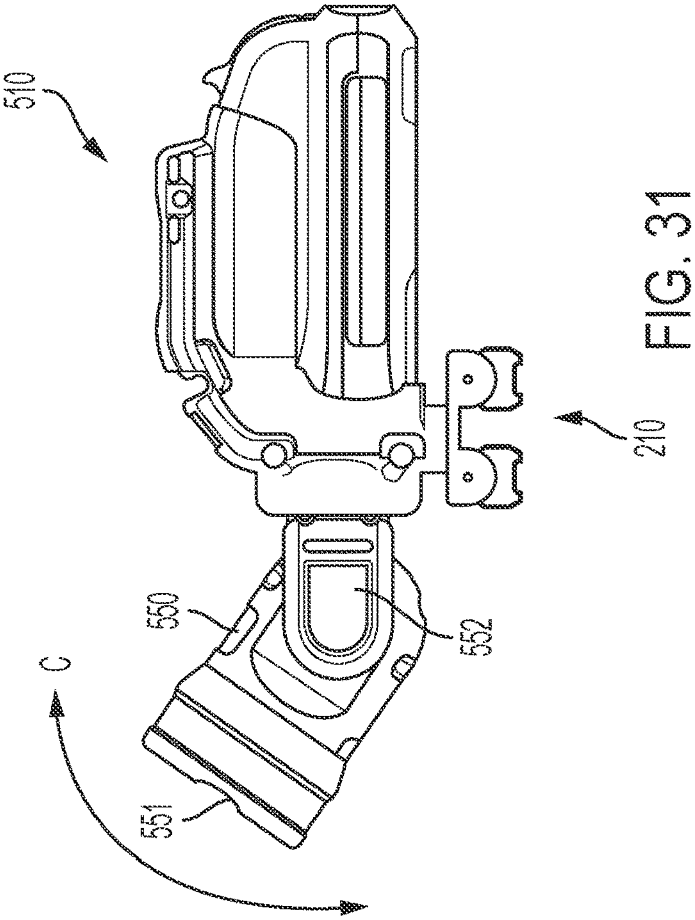
FIG. 31 is another perspective view of the exemplary embodiment of the light.

The mount base 218 may allow the mount members 225 to be slightly or more extensively proud of the surface of the base portion of a light. For example, in FIGS. 28 and 29 the mount bases 218 are slightly proud. In FIGS. 30 and 31, the mount bases 218 are attached to the base portion at a different location. The mount bases 218 may be moved to various locations of the base portion in other exemplary embodiments. In the embodiment of FIGS. 1-8, the mount members 125 are secured below a surface of the base portion 100. In any event, the mount members 125 and 225 may be secured more or less proud and in a variety of different manners and locations.

Figure 17:
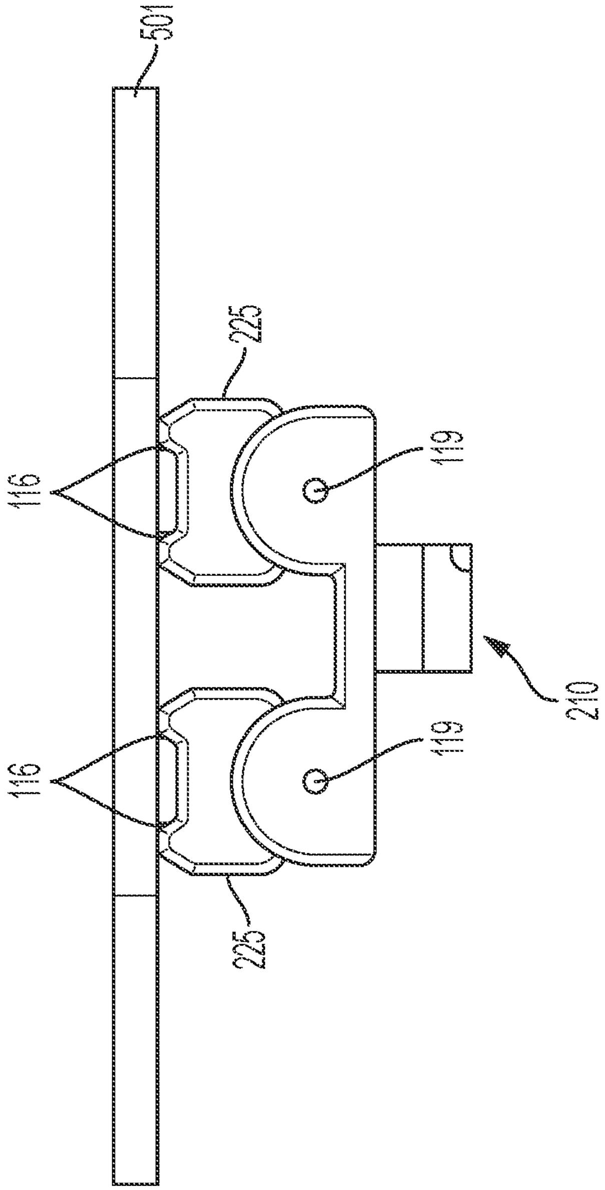
FIG. 17 is a view of the exemplary embodiment of a mount section attached to a flat surface.
Figure 19:
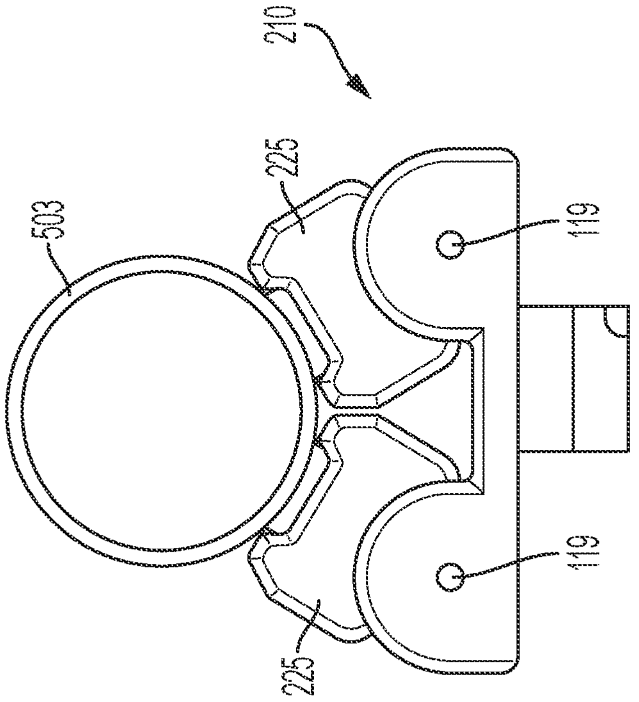
FIG. 19 is a view of the exemplary embodiment of a mount section attached to another pipe.
Figure 18:
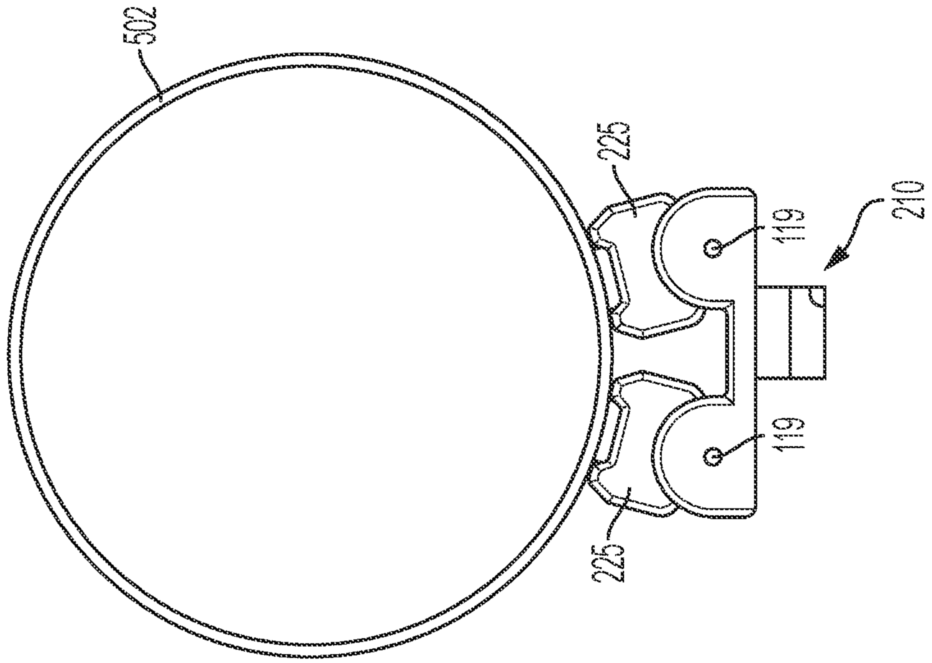
FIG. 18 is a view of the exemplary embodiment of a mount section attached to a pipe.

As shown in FIGS. 17-19, the mount 210 can be attached to various surfaces. The illustration of FIGS. 17-19 is similarly applicable to the mount 110 include mount members 125. In either event, the mount members are rotatable so that they can be secured to a surfaces of a variety of shapes.

As shown in FIG. 17, the mount 210 is readily attachable to a flat metal surface 501. In that instance, the mount members 225 are disposed parallel to one another. Owing to the rotatable nature of the mount members 225, the mount 210 also attaches to curved surfaces. For example, the mount 210 can attach to a large diameter metal pipe 502, as is shown in FIG. 18. The mount 210 can also attach to a small diameter metal pipe 503, as shown in FIG. 19. This allows the light 10 to be attached to a variety of surface, whether flat, curved, or otherwise. While the mount members 225 are shown as pivoting inwardly, towards one another, in FIGS. 18 and 19, they may also pivot outwardly, away from one another. This may be useful when connecting to, for example, a concave surface.

Figure 20:
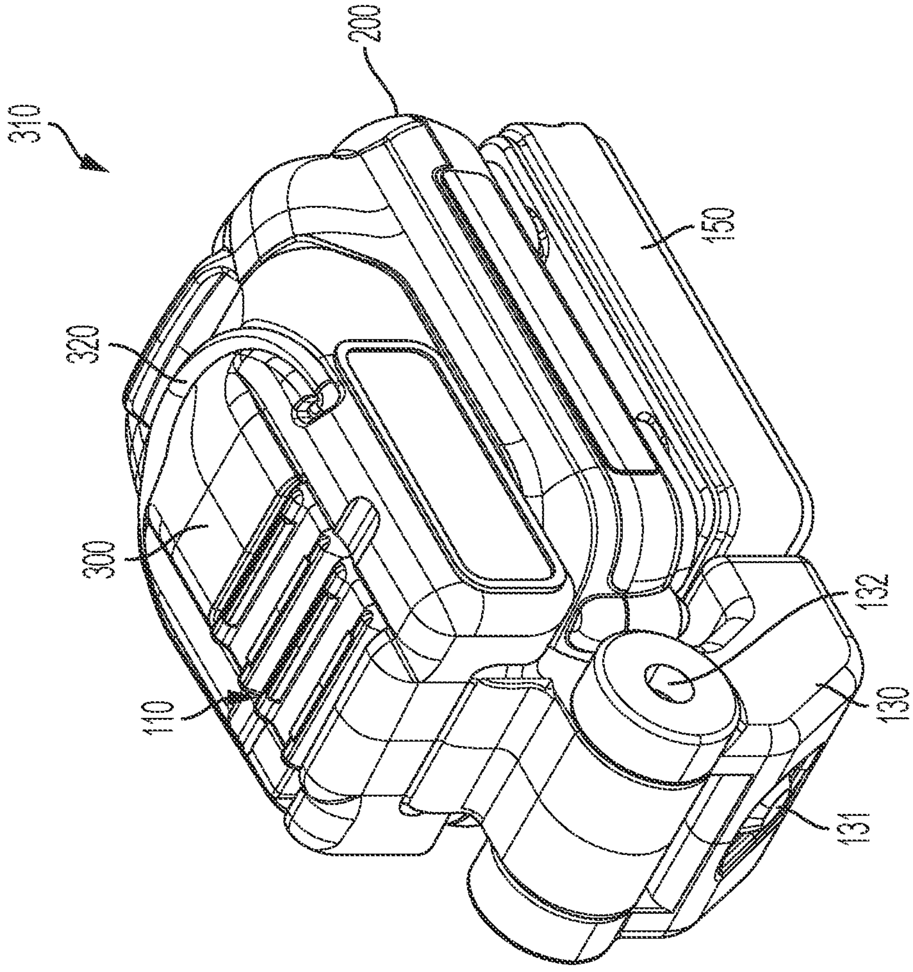
FIG. 20 is a perspective view of another exemplary embodiment of a light including a hook.
Figure 21:
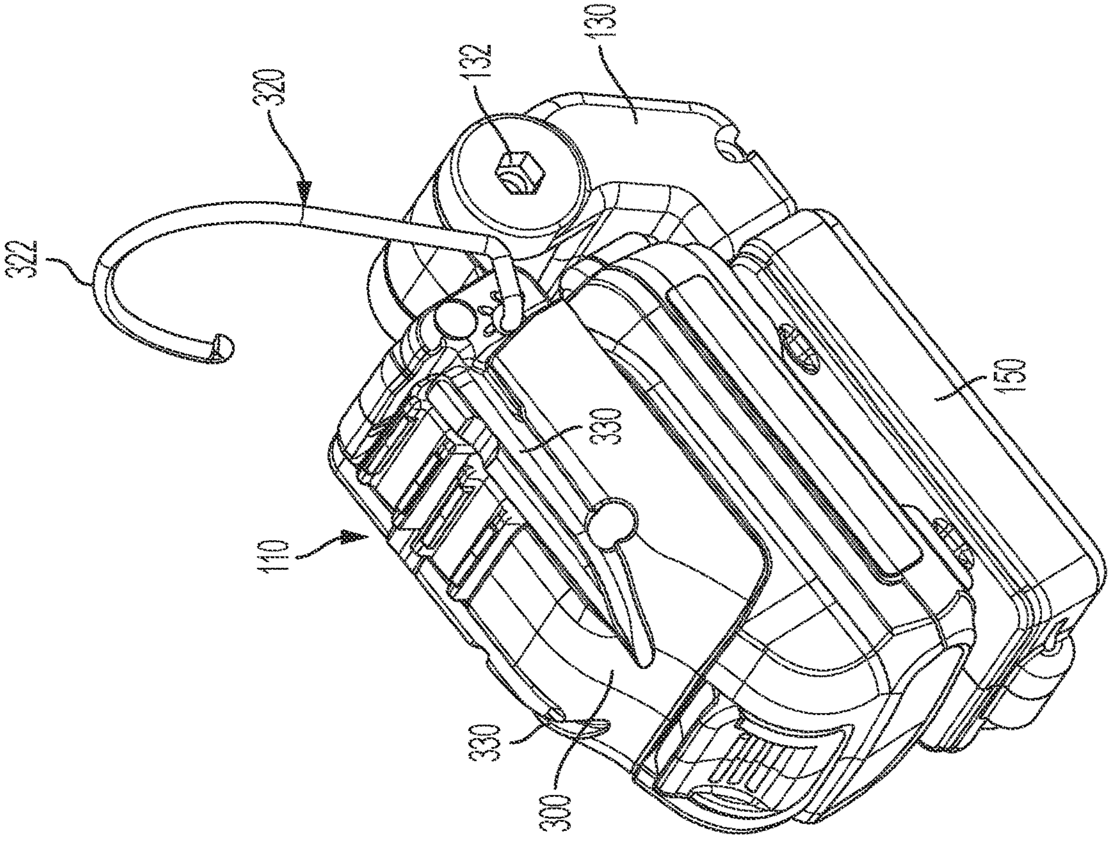
FIG. 21 is another perspective view of the exemplary embodiment of the light including a hook.

FIGS. 20-27 illustrate a light 310. The light 310 is identical to the light 10, except that it includes an additional hook feature. FIG. 20 illustrates a perspective view of the light 310 with the hook 320 in a stored position. FIG. 21 illustrates a perspective view of the light with the hook 320 in an extended position. In the extended position of FIG. 21, the hook 320 may latch onto a pipe, railing or other surface so that the light 310 may hang from the surface. As shown in FIG. 21, the base portion 300 includes a groove 330. The hook 320 is stored in the groove 330 when it is in the stored position, as shown in FIG. 20. The base portion 300 is similar to the base portion 100 of the light 10 other than the alterations needed for the hook feature, such as the hook 320 and the groove 330.

Figure 22:
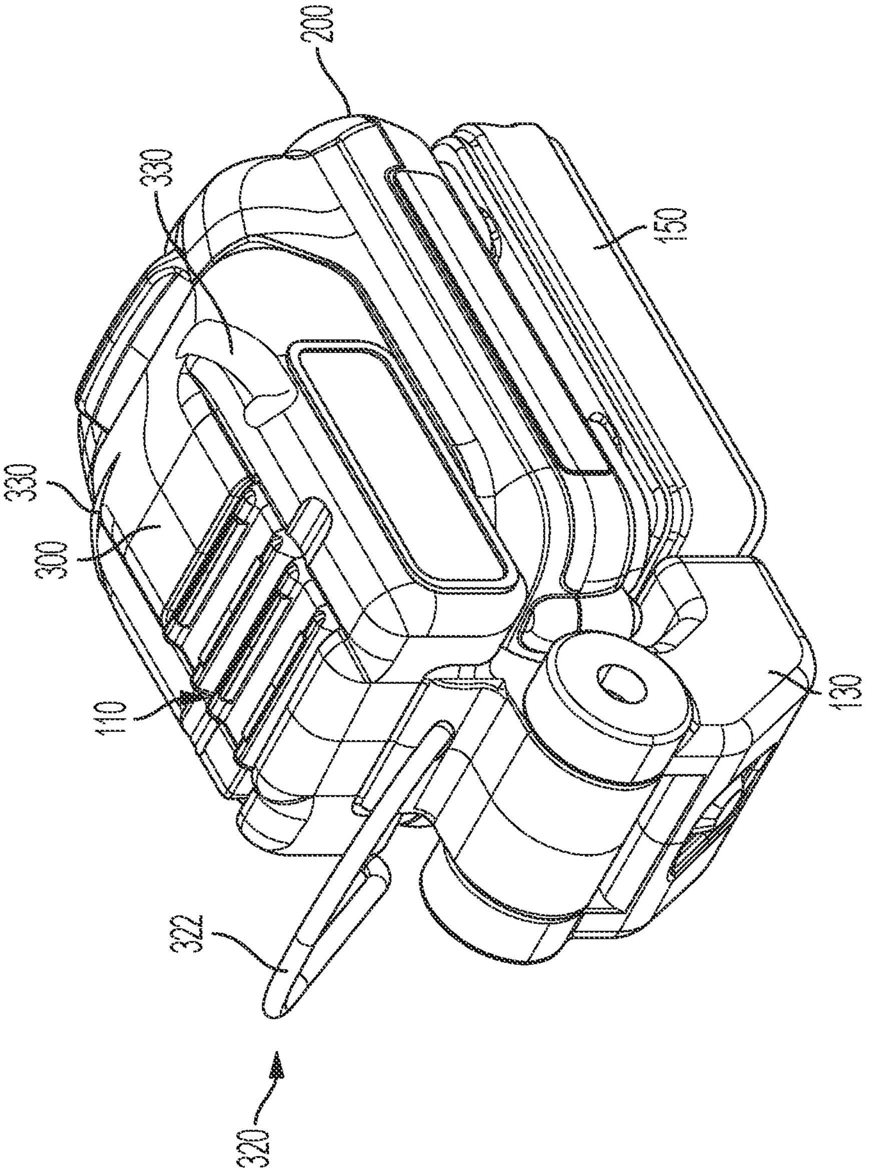
FIG. 22 is another perspective view of the exemplary embodiment of the light including a hook.
Figure 23:
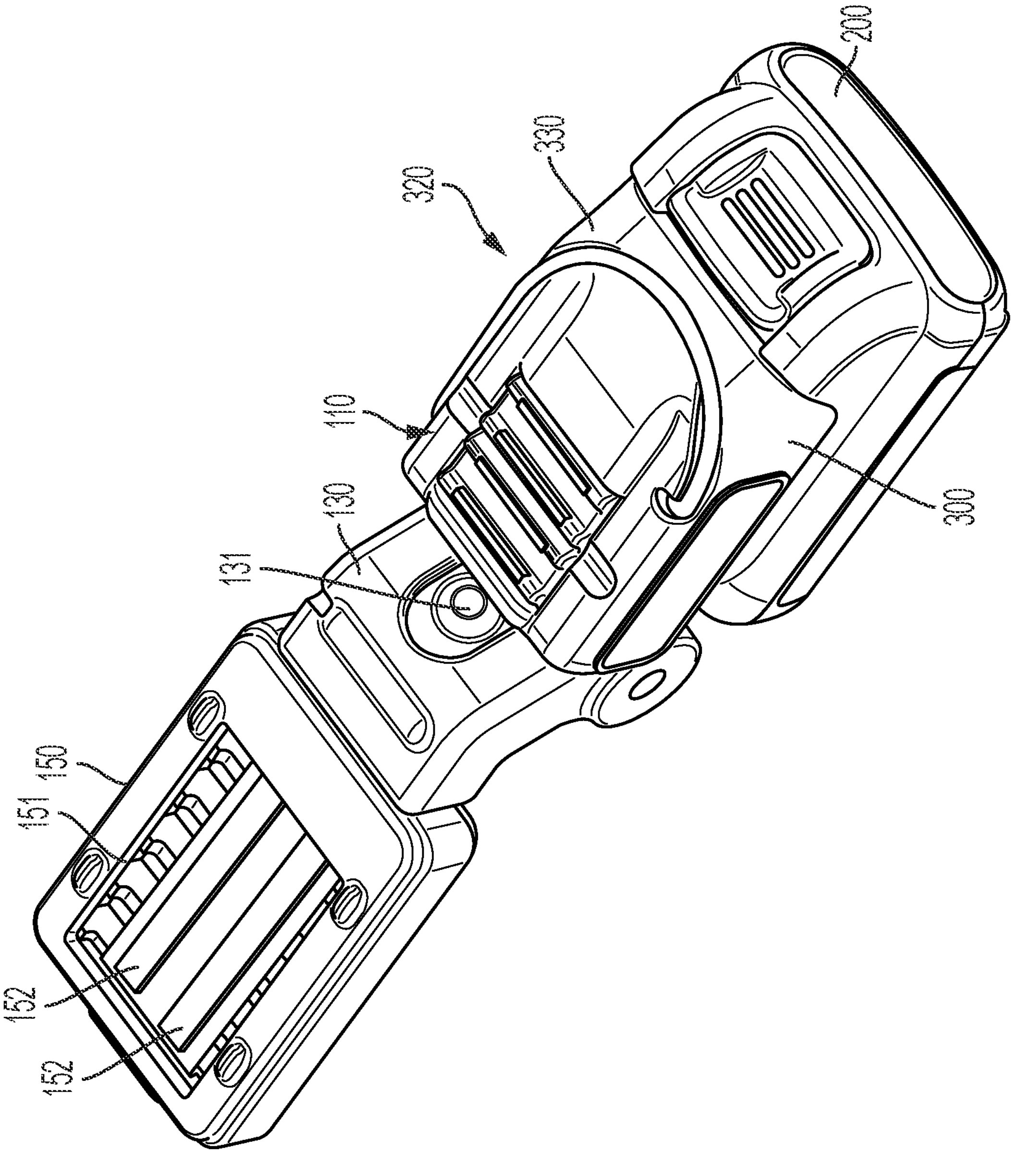
FIG. 23 is another perspective view of the exemplary embodiment of the light including a hook.

FIG. 22 is another perspective view of the light 310 showing the hook 320 in an extended position. FIG. 23 illustrates the light 310 with the light portion 150 in an extended position and the hook 320 in a secured position.

Figure 24:
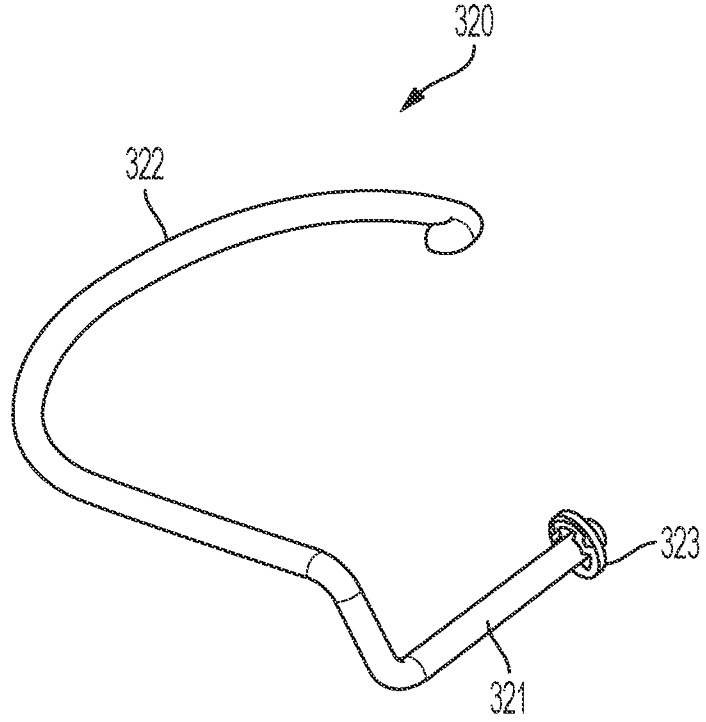
FIG. 24 is a perspective view of the exemplary embodiment of the hook.

FIG. 24 illustrates the hook 320. As shown in FIG. 24, the hook 320 includes a curved end 322 that hooks onto pipes, railings or other objects. It also includes a securing end 321 that connects the hook 320 to the light 310. The hook 320 also includes a spring washer 323. The spring washer 323 helps to secure the hook 320 to the light 310 and also helps the hook 320 to stay in various discreet positions, as will be described in further detail below.

Figure 25:
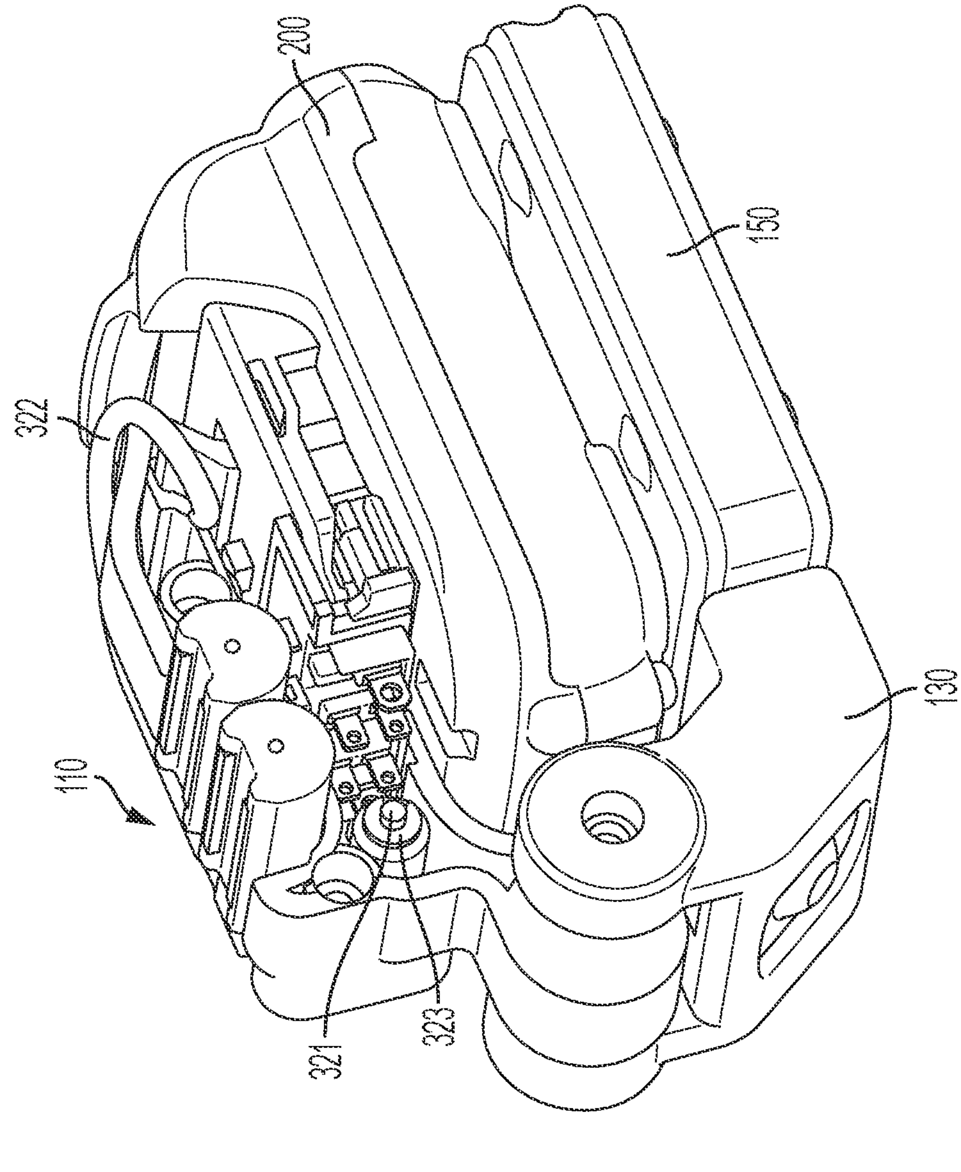
FIG. 25 is a perspective cut-away view of the exemplary embodiment of the light including a hook.

FIG. 25 illustrates a cut-away view of the light 310. As shown in FIG. 25, the washer 323 helps connect the hook 320 to the light 310.

Figure 26:
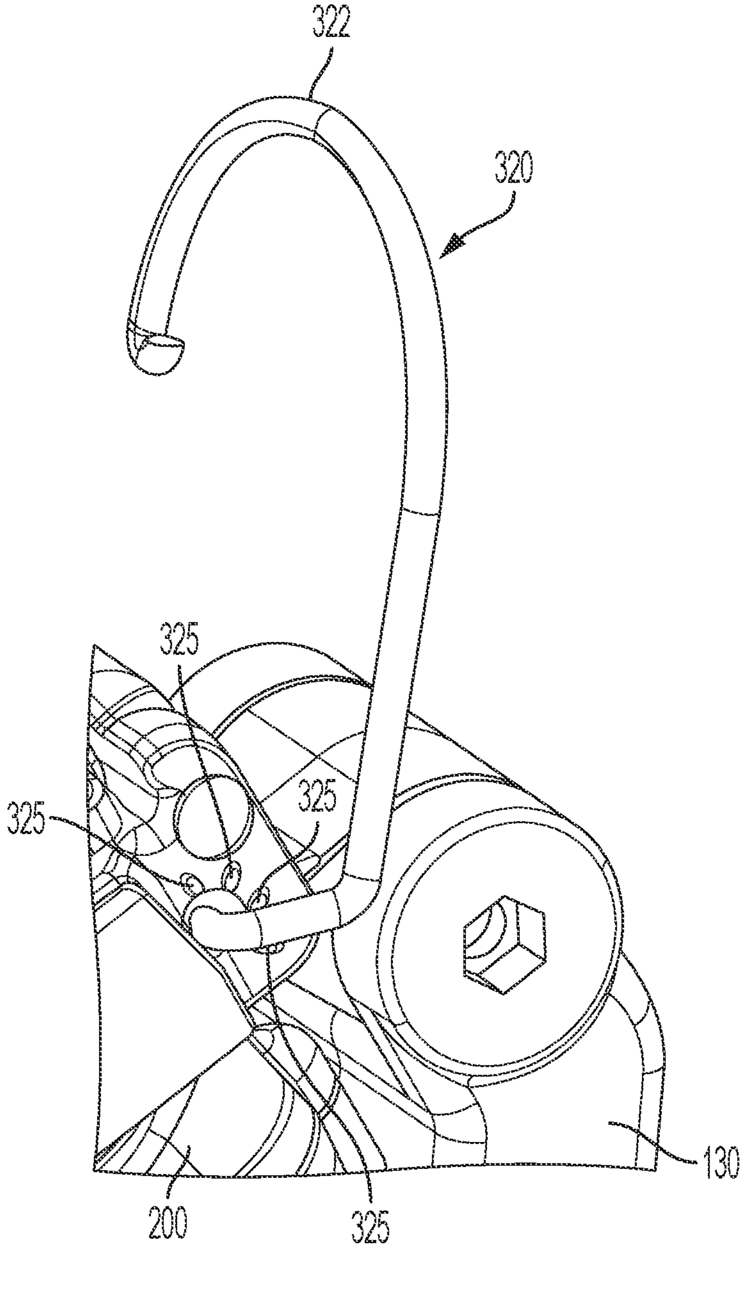
FIG. 26 is a perspective cut-away close-up view of the hook connection of the exemplary embodiment of the light including a hook.

FIG. 26 is a close up view of the connection of the hook 320 with the rest of the light 310. As shown, the securing end 321 of the hook 320 is inserted into the base portion 300 of the light 310. There are a plurality of detents 325 formed in the base portion 300. As will be appreciated, the hook 320 can be rotated such that it sits between a pair of detents 325 and will resist movement from that position. Accordingly, the hook 320 can be placed in a variety of discreet positions. The detents 325 are sufficiently large that the hook 320 will resist movement, but can be overcome by sufficient force from a user rotating the hook. The spring washer 323 is sufficiently flexible that the hook 320 can move outwardly from the hole in the base portion 300 and help the hook 320 to move between the positions delineated by the detents 325.

Figure 27:
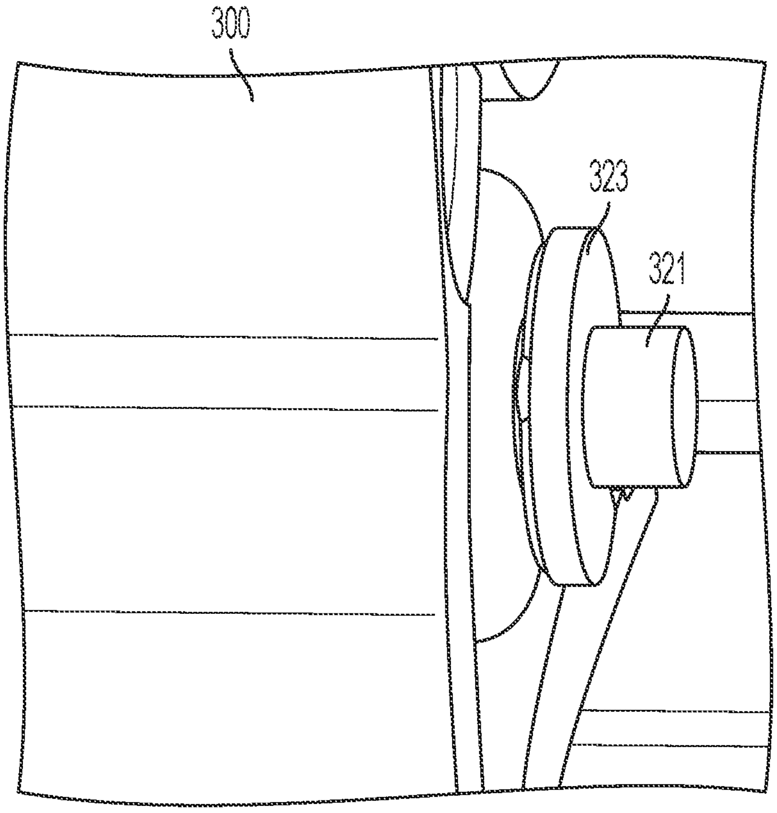
FIG. 27 is another perspective cut-away close-up view of the hook connection of the exemplary embodiment of the light including a hook.

FIG. 27 is a close-up view of the end section 321 of the hook 320 and the spring washer 323. A portion of the light 310 has been removed so that this section may be seen.

Figure 29:
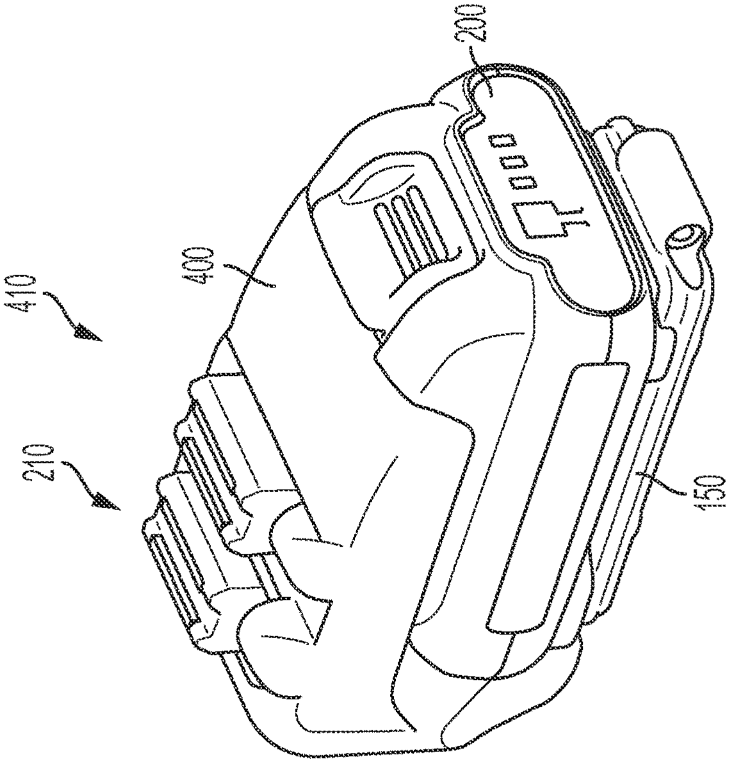
FIG. 29 is another perspective view of the exemplary embodiment of the light.
Figure 28:
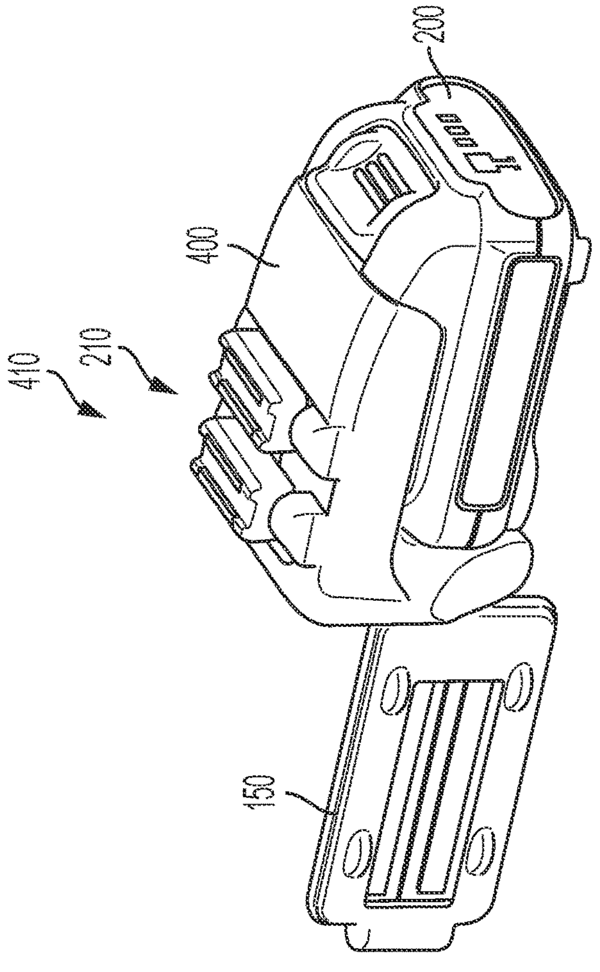
FIG. 28 is a perspective view of another exemplary embodiment of a light.
Figure 30:
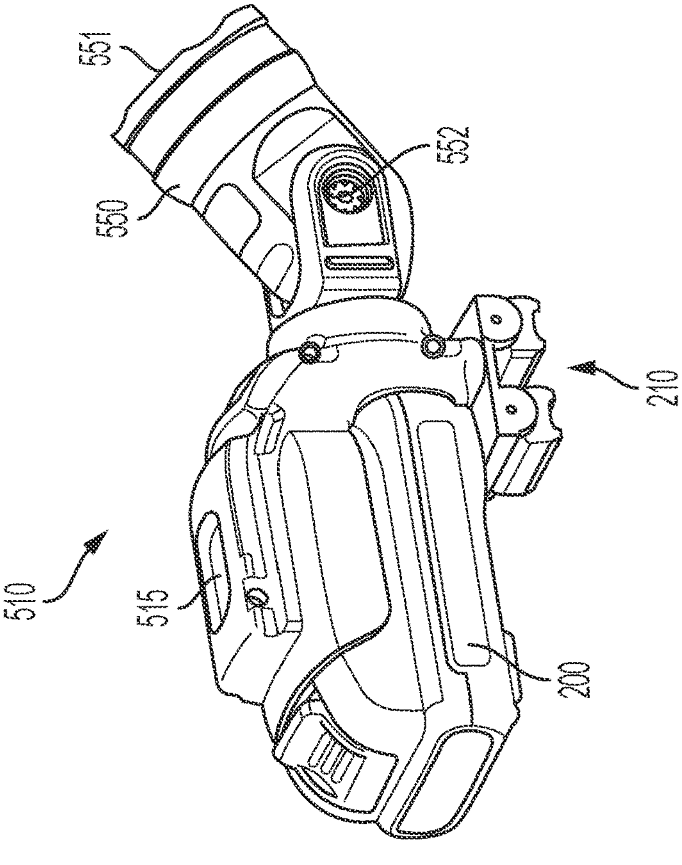
FIG. 30 is a perspective view of another exemplary embodiment of a light.

FIGS. 28 and 29 illustrate another exemplary embodiment of a light 410. The light 410 is similar to the lights 10 and 310. However, the light 410 omits the intermediate portion 130. Instead, the lighting section 150 is directly connected to the base portion 400. The lighting section 150 can rotate about two axes, in the same manner shown in FIG. 1B. An actuation switch (not shown) may be disposed on either the base portion 400 or the lighting section 150. Omitting the intermediate portion allows for a more compact light that may be cheaper to construct and more easily stored. The exemplary embodiment of the light 410 shown in FIGS. 28 and 29 include the mount 210. However, it should be understood that the mount 110 may be used instead. Additionally, the hook 320 and related features of FIGS. 20-27 may be added to the light 410. FIG. 28 illustrates the light 410 in an open position and FIG. 29 shows light 410 in a closed position.

FIGS. 30 and 31 illustrate another exemplary embodiment of a light 510. The light 510 includes a base portion 500 which engaged with the battery 200 which powers the light. An activation switch 515 is disposed on the base portion 500, as shown in FIG. 30. In the exemplary embodiment of the light 510 shown in FIG. 30, the mount 210 is disposed on a bottom portion of the light 510. Additionally, the light 510 utilized a different lighting section 550. The lighting section 550 is a flashlight head. Light projects out of a lens 551. Light may be generated in the flashlight head 550 by one or more LEDs or by a bulb, for example. Additionally, the flashlight head 550 may include a reflector to direct the light. The flashlight head 550 is rotatable about an axis 552, as shown by the arrow C.

It is contemplated that the features of the various embodiments may be combined or substituted. For example, the lighting section 550 may be substituted for the lighting section 150 and vice versa. Similarly, the mounts 210 and 110 may be used in the various different embodiments, and the mounts 210, 110 may be placed at different locations on the lights. Additionally, the intermediate section 130 may be added or removed from different embodiments. The location of the actuation switch may also be changed.

Although the present technology has been described in detail for the purpose of illustration based on what is currently considered to be the most practical and preferred embodiments, it is to be understood that such detail is solely for that purpose and that the technology is not limited to the disclosed embodiments, but, on the contrary, is intended to cover modifications and equivalent arrangements that are within the spirit and scope of the appended claims. For example, it is to be understood that the present technology contemplates that, to the extent possible, one or more features of any embodiment can be combined with one or more features of any other embodiment.

What is claimed is:

1. A light, comprising:

a battery pack;

a base portion which engages the battery pack;

an intermediate section rotatably connected to the base portion;

a light section rotatably connected to the intermediate section, wherein the light section comprises a light generator which produces light and a light projecting surface from which the light is projected;

wherein the intermediate section is rotatable relative to the base portion about a first axis;

wherein the light section is rotatable relative to the intermediate section about a second axis;

wherein the first axis is orthogonal to the second axis;

wherein the light generator comprises a plurality of light emitting diodes;

wherein the battery pack is removable from the base portion;

wherein the battery pack is a power tool battery pack;

wherein the light section is wider than the intermediate section;

wherein the intermediate section is rotatable relative to the base portion about an angle substantially greater than ninety degrees; and wherein the second axis is a longitudinal axis of the light section;

wherein the intermediate section comprises a first portion, a second portion and a third portion;

wherein the first portion is closer to the first axis than the second portion and third portion are to the first axis;

wherein the third portion is closer to the light section than the first portion and the second portion are to the light section;

wherein the second portion is between the first portion and the third portion;

wherein the second portion extends at an angle between the first portion and the third portion;

wherein the second portion has a second portion side face with a first edge and a second edge;

wherein the first edge extends generally parallel to the second edge;

wherein the third portion has a third portion side face with a third edge and a fourth edge;

wherein the third edge extends generally parallel to the fourth edge;

wherein the first edge is at an angle with respect to the third edge.

2. The light of claim 1, wherein the plurality of light emitting diodes comprises an array of light emitting diodes.

3. The light of claim 1, wherein the second axis runs through substantially the center of the light section.

4. The light of claim 1, wherein the light section comprises a substantially rectangular box shape.

5. The light of claim 1, wherein when the battery pack is received in the base portion multiple surfaces of the battery pack remain exposed.

6. The light of claim 1, further comprising a hook;

wherein the hook is movable between a stored position and an extended position.

7. The light of claim 6, wherein the hook extends from the base portion.

8. The light of claim 1, wherein the second portion of the intermediate section connects to the light section.

9. The light of claim 8, wherein the second portion extends along an axis that is generally perpendicular to and offset from the first axis.

10. The light of claim 1, wherein the first portion of the intermediate section extends in a direction generally perpendicular to the third portion of the intermediate section.

11. The light of claim 1, wherein the second portion side face is generally flat in a plane perpendicular to the first axis.

12. The light of claim 1, wherein the light section is wider than the intermediate section at an area where the light section meets the intermediate section.

13. A light, comprising:

a battery pack;

a base portion which engages the battery pack;

an intermediate section rotatably connected to the base portion;

a light section rotatably connected to the intermediate section, wherein the light section comprises a light generator which produces light and a light projecting surface from which the light is projected;

wherein the intermediate section is rotatable relative to the base portion about a first axis;

wherein the light section is rotatable relative to the intermediate section about a second axis;

wherein the first axis is orthogonal to the second axis;

wherein the battery pack is removable from the base portion;

wherein the battery pack is a power tool battery pack;

wherein the light section is wider than the intermediate section;

wherein the intermediate section is rotatable relative to the base portion about an angle substantially greater than ninety degrees;

wherein the second axis is a longitudinal axis of the light section wherein the intermediate section comprises an angled portion and a light connecting portion;

wherein the angled portion has an angled portion first side and angled portion second side opposite the angled portion first side;

wherein the angled portion first side is generally flat in a first plane perpendicular to the first axis;

wherein the angled portion second side is generally flat in a second plane perpendicular to the first axis;

wherein the light connecting portion extends from the angled portion to the light section;

wherein the light connecting portion comprises a light connecting portion first side with a first edge and a second edge;

wherein the first edge extends generally parallel to the second edge; and wherein the first edge extends generally parallel to the second axis.

14. The light of claim 13, wherein the light generator comprises a plurality of light emitting diodes;

wherein the plurality of light emitting diodes are arrayed such that they extend parallel to the second axis.

15. The light of claim 14, wherein the second axis runs through substantially the center of the light section.

16. The light of claim 15, wherein when the battery pack is received in the base portion multiple surfaces of the battery pack remain exposed.

17. The light of claim 13, wherein the light section is wider than the intermediate section at an area where the light section meets the intermediate section.

18. A light, comprising:

a battery pack;

a base portion which engages the battery pack;

an intermediate section rotatably connected to the base portion;

a light section rotatably connected to the intermediate section, wherein the light section comprises a light generator which produces light and a light projecting surface from which the light is projected;

wherein the intermediate section is rotatable relative to the base portion about a first axis;

wherein the light section is rotatable relative to the intermediate section about a second axis;

wherein the first axis is orthogonal to the second axis;

wherein the battery pack is removable from the base portion;

wherein the battery pack is a power tool battery pack;

wherein only a portion of the battery pack is received in the base portion;

further comprising a hook;

wherein the hook is movable between a stored position and an extended position; and wherein the second axis is a longitudinal axis of the light section;

wherein the intermediate section comprises an angled portion which projects at an angle with respect to the first axis so as to space the second axis from the first axis such that the second axis is offset from the first axis;

wherein the angled portion has a first side and a second side opposite the first side;

wherein the first side is generally flat in a first plane perpendicular to the first axis; and wherein the second side is generally flat in a second plane perpendicular to the first axis;

wherein the intermediate section further comprises a light connection portion disposed between the angled portion and the light section;

wherein the angled portion extends at an angle with respect to the light connection portion;

wherein light connection portion comprises a light connection portion side face;

wherein the light connection portion side face is generally flat and is in the first plane.

19. The light of claim 18, wherein the intermediate section is rotatable relative to the base portion about an angle substantially greater than ninety degrees.

20. The light of claim 18, wherein the light section is wider than the intermediate section.

* * * * *